United States Patent [19]
Kameyama

[11] Patent Number: 5,988,961
[45] Date of Patent: Nov. 23, 1999

[54] MACHINE TOOL WITH PIVOTING RELEASE LEVER

[75] Inventor: Fumio Kameyama, Nagoya, Japan

[73] Assignee: Brother Kogyo Kabushiki Kaisha, Nagoya, Japan

[21] Appl. No.: 09/144,092

[22] Filed: Aug. 31, 1998

[30] Foreign Application Priority Data

Sep. 1, 1997 [JP] Japan .................................. 9-235716

[51] Int. Cl.$^6$ .................................................. B23C 1/00
[52] U.S. Cl. ........................ 409/233; 408/238; 409/231; 483/44; 483/49
[58] Field of Search ........................... 408/238; 409/231, 409/232, 234, 233; 483/44, 45, 49

[56] References Cited

U.S. PATENT DOCUMENTS

| | | | |
|---|---|---|---|
| 2,476,781 | 7/1949 | Tomlinson | 279/4.08 |
| 2,565,330 | 8/1951 | Sundt | 279/4.08 |
| 4,583,892 | 4/1986 | Armbruckner | 409/231 |
| 4,704,056 | 11/1987 | Babel | 408/240 |
| 4,833,772 | 5/1989 | Kobayashi et al. | |
| 5,081,762 | 1/1992 | Kin | |
| 5,816,987 | 10/1998 | Yan et al. | 483/49 |

FOREIGN PATENT DOCUMENTS 3-92239   4/1991   Japan .

*Primary Examiner*—Daniel W. Howell
*Assistant Examiner*—Christopher Kirkman
*Attorney, Agent, or Firm*—Oliff & Berridge, PLC

[57] ABSTRACT

A machine tool includes a spindle to which a tool is detachably attached to be clamped, an unclamping lever provided for rocking motion and having two ends, rocking means for rocking the unclamping lever, a releasing section provided in the spindle so as to be pressed by the unclamping lever when the unclamping lever is rocked by the rocking means with a tool being clamped by the spindle, thereby releasing the tool from a clamped state, and a support shaft for rockably supporting the unclamping lever, the support shaft being movable axially with respect to the spindle.

10 Claims, 6 Drawing Sheets

5,988,961

MACHINE TOOL WITH PIVOTING RELEASE LEVER

BACKGROUND OF THE INVENTION

1. Field of the Invention

This invention relates to a machine tool including an unclamping lever which is rocked so that a tool attached to a spindle is released from a clamped state.

2. Description of the Related Art

Japanese Laid-open Patent Publication No. 3-92239 (1991) discloses a machine tool of the above-described type. In the disclosed construction, the machine tool comprises a spindle head in which a spindle is provided. A cam is also provided in the spindle head and constitutes unclamping lever pressing means. An unclamping lever is rockably mounted between the spindle and the cam. In exchanging a tool attached to the spindle to another, one end of the unclamping lever is pressed by the cam so that the unclamping lever is rocked. The other end of the unclamping lever then presses a releasing section of the spindle axially with respect to the spindle. With this pressing operation, the tool attached to the spindle is released from a clamped state, and the tool is pushed out. Simultaneously, an exchanging arm of a tool exchanger holds the tool pulling it out of the spindle.

In the above-described machine tool, an amount of press unclamping lever applies to the releasing section of the spindle is sometimes improper due to dimensional errors and wear of parts. When the amount of press by the unclamping lever is smaller, the tool cannot be released from the clamped state. When the amount of press is larger, the tool is released from the clamped state too early. Thus, the tools cannot sometimes be changed efficiently when the amount of press is improper.

In the above-described machine tool, the unclamping lever is rockably mounted on support shafts which are fixed in position. As a result, the amount of press by the unclamping lever cannot be adjusted readily. An adjusting spacer has been proposed to be mounted between the unclamping lever and the releasing section of the spindle. In this case, however, a portion of the machine tool around the unclamping lever and the releasing section needs to be disassembled when the spacer is attached to or detached from the machine tool. The disassembling work and adjustment take much time.

SUMMARY OF THE INVENTION

Therefore, an object of the present invention is to provide a machine tool in which an amount of press the unclamping lever applies to the releasing section can readily be adjusted.

The present invention provides a machine tool comprising a spindle to which a tool is detachably attached to be clamped, an unclamping lever provided for rocking motion and having two ends, rocking means for rocking the unclamping lever, a releasing section provided in the spindle so as to be pressed by the unclamping lever when the unclamping lever is rocked by the rocking means with a tool being clamped by the spindle, thereby releasing the tool from a clamped state, and a support shaft for rockably supporting the unclamping lever, the support shaft being movable axially with respect to the spindle.

According to the above-described construction, the support shaft is moved axially with respect to the spindle so that an amount of press of the unclamping lever can be adjusted.

In a preferred form, the support shaft includes a mounting shaft having a shaft center shifted axially from a shaft center of the support shaft, and the support shaft and the mounting shaft are movable about the shaft center of the mounting shaft. Furthermore, the machine tool preferably further comprises rotating operation means provided on the mounting shaft for rotating the support shaft and the mounting shaft.

BRIEF DESCRIPTION OF THE DRAWINGS

Other objects, features and advantages of the present invention will become clear upon reviewing the following description of the preferred embodiment thereof, made with reference to the accompanying drawings, in which.

DESCRIPTION OF THE PREFERRED EMBODIMENTS

Figure 1:
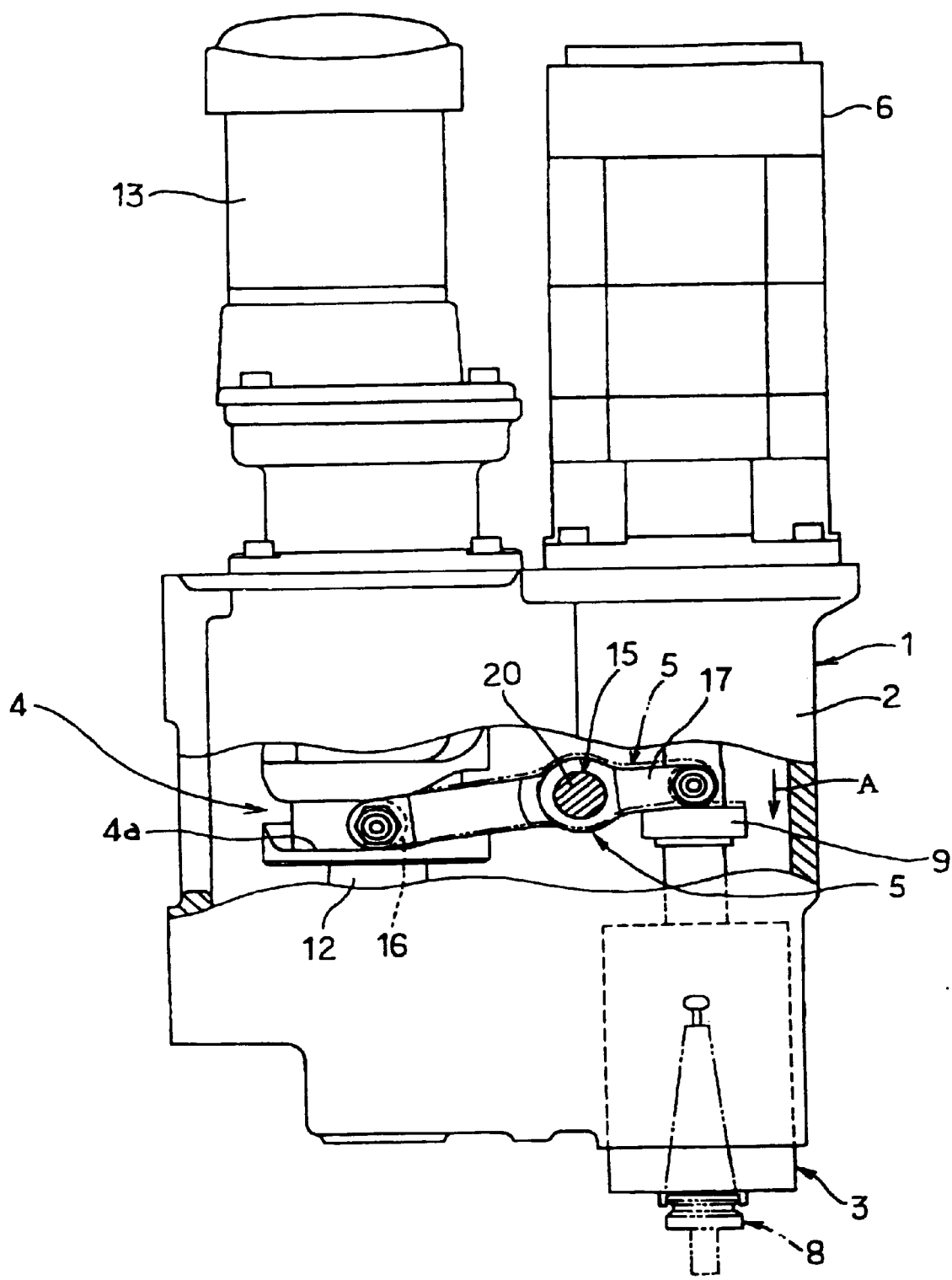
FIG. 1 is a partially broken side view of a spindle head of the machine tool of a first embodiment in accordance with the present invention.

A first embodiment of the present invention will be described with reference to FIGS. 1 to 4. Referring to FIG. 1, a spindle head 1 of the machine tool of the first embodiment in accordance with the invention is shown. The spindle head 1 is provided to be reciprocally movable in a direction of Z-axis (upward and downward in FIG. 1) along a Z-axis guide further provided on a column (not shown) of the machine tool. The spindle head 1 comprises a frame 2 in which a spindle 3, a tool exchanging cam 4 constituting pressing means, and an unclamping lever 5.

The spindle 3 is rotated by a spindle motor 6 mounted on an upper portion of the frame 2. A tool attaching section (not shown) is provided on a lower end of the spindle 3, as well known in the art. A tool 8 is detachably attached to the tool attaching section from below as viewed in FIG. 1. The tool attaching section is provided with a holding or clamping mechanism for holding or clamping the tool 8. For example, U.S. Pat. No. 4,833,772 discloses the construction of a tool attaching section.

A releasing section 9 is provided on the upper portion of the spindle 3. The releasing section 9 comprises a ring-shaped member, for example. The tool 8 is released from the clamped state and pushed out when the releasing section 9 is pushed downward with the tool 8 being attached to the tool attaching section. The cam 4 is mounted on a cam shaft 12 disposed in parallel with the spindle 3. A cam motor 13 is mounted on the upper portion of the frame 2. The cam motor 13 drives via the cam shaft 12 the cam 4.

The unclamping lever 5 is disposed between the spindle 3 and the cam 4 in the frame 2 and rotatably or rockably mounted at its middle portion on a fulcrum shaft 15 further mounted on the frame 2. A cam follower 16 is rotatably mounted on one end (a left-hand end in FIG. 2) of the unclamping lever 5. The cam follower 16 is inserted in a cam groove 4a formed in the cam 4. The unclamping lever 5 has bifurcated arms 17 formed integrally on the other end thereof which is at the spindle 3 side. The arms 17 have two pressing portions 18 formed on the distal ends to be opposed to each other, respectively. The pressing portions 18 comprise respective rotatable cam followers, for example, and are placed on an upper face of the releasing section 9.

Figure 2:
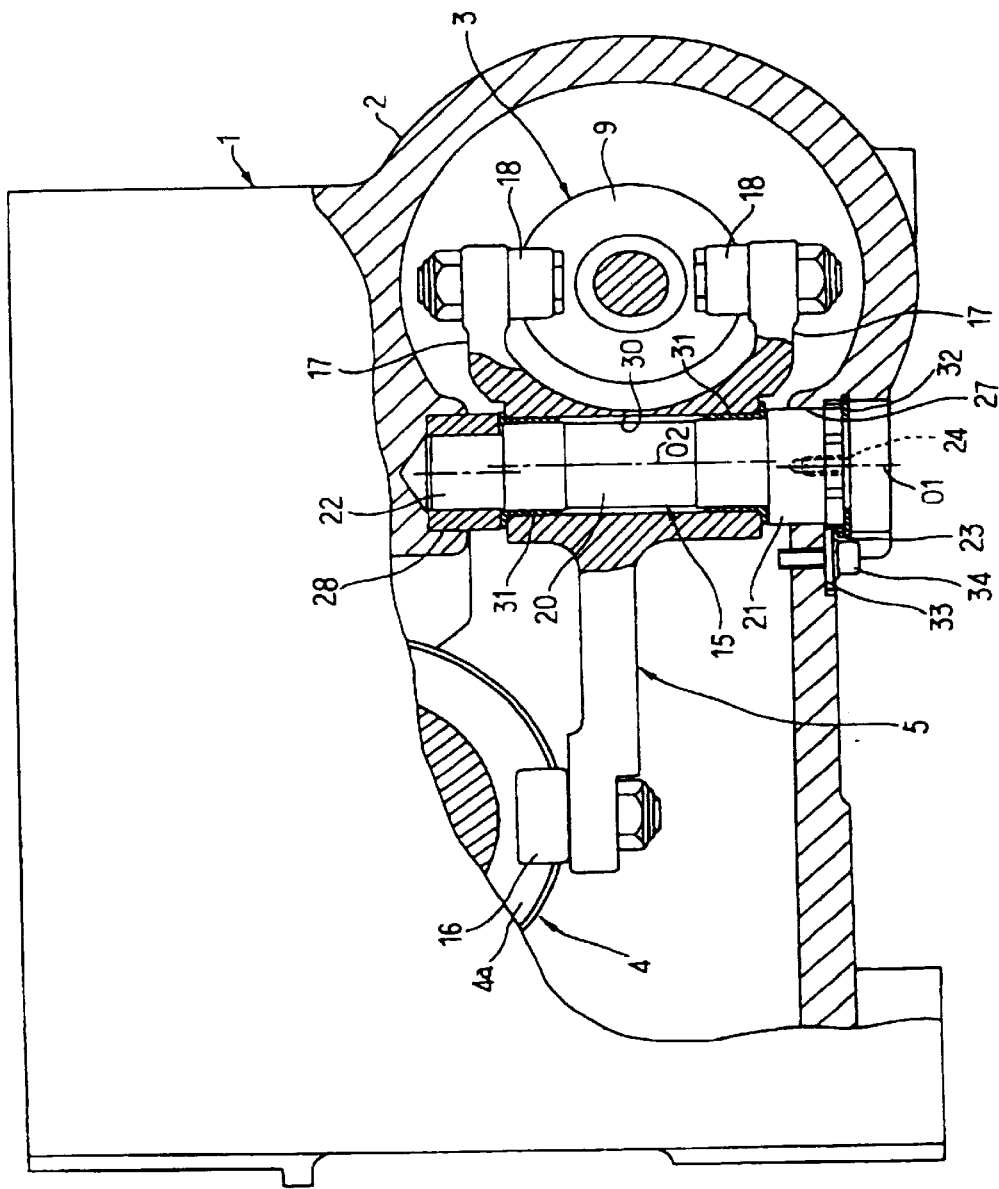
FIG. 2 is a partially broken plan view of the spindle head.
Figure 4:
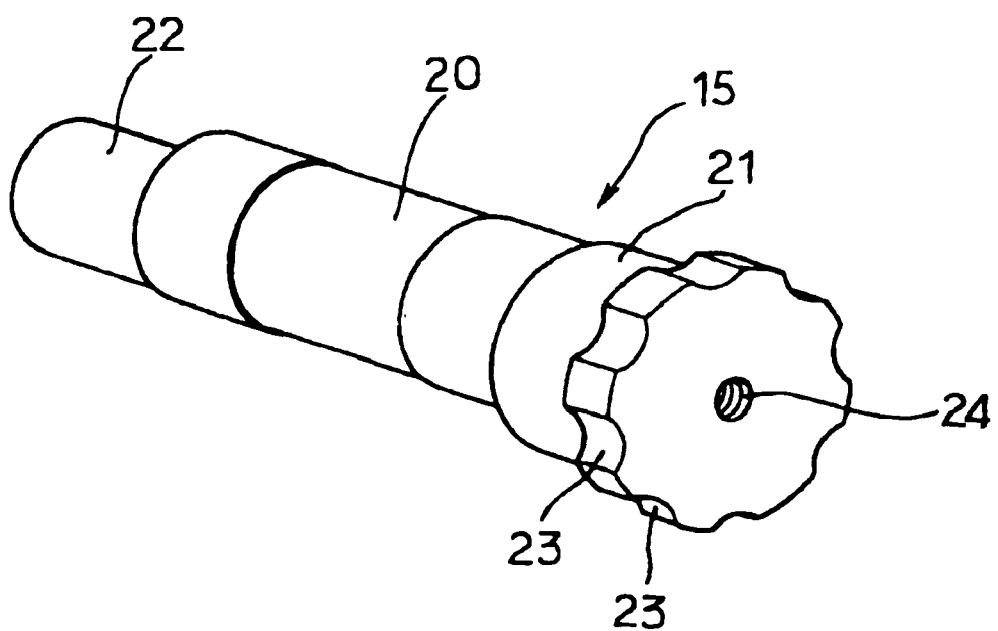
FIG. 4 is a perspective view of a fulcrum shaft.

The fulcrum shaft 15 includes a stepped columnar support shaft 20 located in a middle portion thereof and short columnar first and second mounting shafts 21 and 22 provided integrally on both ends of the support shaft 20, as shown in FIGS. 2 and 4. The first mounting shaft 21 has a larger outer diameter than the support shaft 20, whereas the second mounting shaft 22 has a smaller outer diameter than the support shaft 20. Accordingly, the outer diameter of the forward mounting shaft 21 is larger than that of the rear mounting shaft 22.

Figure 3:
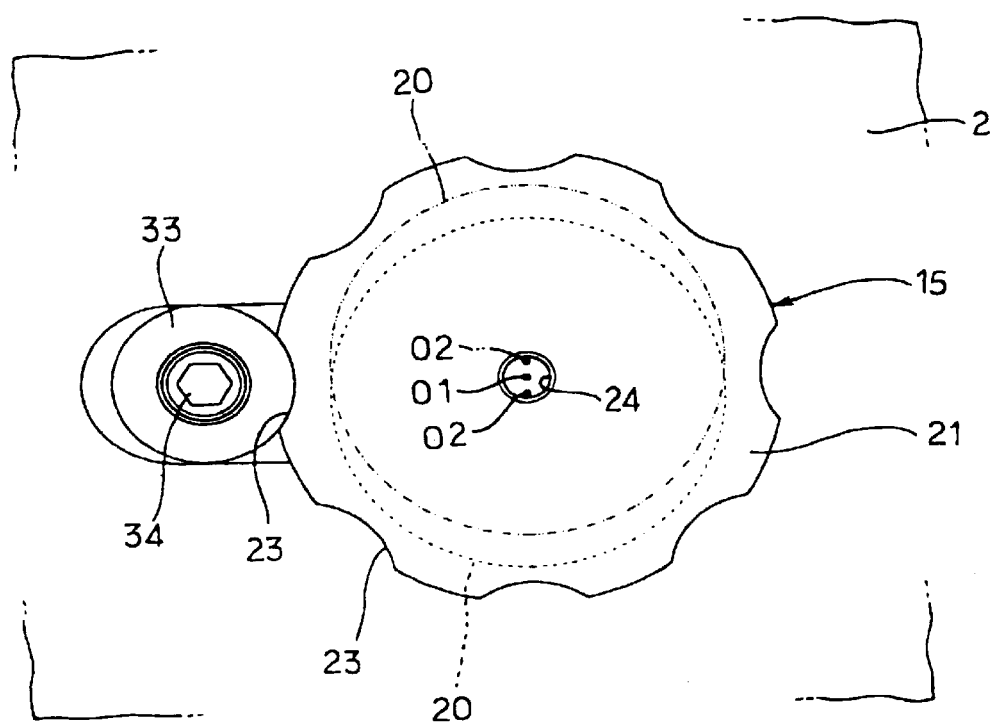
FIG. 3 is a side view of the mounting shaft and the peripheral parts with a stop ring being eliminated.

Shaft centers of the first and second mounting shafts 21 and 22 correspond with each other. Reference symbol O1 in FIG. 2 designates a line between the shaft centers of the first and second mounting shafts 21 and 22. On the other hand, a shaft center of the support shaft 20 is shifted or displaced radially relative to the line O1. Reference symbol O2 in FIG. 2 designates the axis of the support shaft 20. Thus, the support shaft 20 is eccentric or decentered relative to the first and second mounting shafts 21 and 22. The first mounting shaft 21 has eight notches 23 formed in an outer circumference of its end at regular intervals, for example, as shown in FIGS. 3 and 4. Furthermore, the first mounting shaft 21 has a screw hole 24 formed in the center of its end face. The screw hole 24 and a screw (a hexagon head screw, for example) screwed into the screw hole constitute rotating operation means for turning the fulcrum shaft 15.

The frame 2 has a mounting hole 27 formed in a side wall thereof located at the side where the fulcrum shaft 15 is inserted, as shown in FIG. 2. A bush 28 is provided inside the frame 2 so as to be opposed to the mounting hole 27. The unclamping lever 5 has a shaft insertion hole 30 formed in the middle portion thereof. Two bearing bushes 31 are fitted in the shaft insertion hole 30 to be located near both ends of the shaft insertion hole.

In assembling the unclamping lever 5 into the frame 2, the fulcrum shaft 15 is first inserted into the mounting hole 27 of the frame 2 from the second mounting shaft 22 thereof. Then, the second mounting shaft 22 is inserted into the bush 28 after having been inserted into the shaft insertion hole 30 of the unclamping lever 5. Thereafter, a generally C-shaped stop ring 32 is attached to an annular groove formed in the inner circumference of the mounting hole 27. The stop ring 32 prevents the fulcrum shaft 15 from falling off. The stop ring 32 is eliminated in FIG. 3. When the fulcrum shaft 15 is mounted as described above, the unclamping lever 5 is mounted on the frame 2 so as to be rocked about the support shaft 20 of the fulcrum shaft 15. In this state, the outer end face of the first mounting shaft 21 of the fulcrum shaft 15 can be viewed from outside.

A ring-shaped lock plate 33 is mounted near the fulcrum shaft 15 on the side wall of the frame 2 by a screw 34, as shown in FIGS. 2 and 3. A part of the outer circumference of the lock plate 33 is fitted into one of the notches 23 of the first mounting shaft 21 so that the fulcrum shaft 15 is positioned with respect to its rotational direction. Thus, the lock plate 33 and the notches 23 constitute positioning means for positioning the fulcrum shaft 15, namely, the support shaft 20 and the mounting shafts 21 and 22.

The cam 4 is rotated by the cam motor 13 when the tool 8 attached to the tool attaching section of the spindle 3 is exchanged to another. When the cam 4 presses the end (left-hand end) of the unclamping lever 5 upward, the unclamping lever is rocked about the support shaft 20 of the fulcrum shaft 15 so that the pressing portions 18 at the other end (right-hand end) thereof are displaced downward, as shown by arrow A in FIG. 1. Consequently, the pressing portions 18 press the releasing operation portion 9 of the spindle 3 downward, so that the tool 8 is released from the clamped state and pushed out. At the same time, the tool 8 is held by an exchanging arm of a tool exchanger (not shown) to be pulled out of the spindle 3.

In adjusting an amount of press of the unclamping lever 5 against the releasing operation portion 9, the fulcrum shaft 15 about which the unclamping lever 5 is rotated about the shaft centers of the first and second mounting shafts 21 and 22. The support shaft 20 of the fulcrum shaft 15 is then displaced upward or axially with respect to the spindle 3. See broken line and two-dot chain line in FIG. 2. The reason for this displacement is that the support shaft 20 supporting the unclamping lever 5 is decentered relative to the first and second mounting shafts 21 and 22 located at the opposite sides thereof. When the fulcrum shaft 15 is rotated, the screw (not shown) such as a hexagon head bolt is screwed into the screw hole 24 with the lock plate 33 being detached from the notch 23. The screw is turned with a tool such as a spanner. Furthermore, as shown in FIG. 3, the vertical position of the support shaft 20 is adjustable in five stages. In this case, when the vertical position of the support shaft 20 is changed, the support shaft 20 and accordingly the unclamping lever 5 are slightly displaced horizontally within an allowable range.

The amount of press of the unclamping lever 5 against the releasing section 9 is varied with the change in the vertical position of the support shaft 20. The amount of press is increased when the support shaft 20 is set to be located at the lower side, whereas the amount of press is decreased when the support 20 is set to be located at the upper side. In FIG. 1, the unclamping lever 5 is shown by the solid line when the support shaft 20 is set to be located at the lowermost side. The unclamping lever 5 is shown by the two-dot chain line when the support shaft 20 is set to be located at the uppermost side.

Thus, the amount of press of the unclamping lever 5 against the releasing section 9 is adjusted when the fulcrum shaft 15 is rotated as described above. When the position of the fulcrum shaft 15 has been determined, the lock plate 33 is fitted into the corresponding notch 23 to be fixed, so that the fulcrum shaft 15 is positioned.

Figure 5:
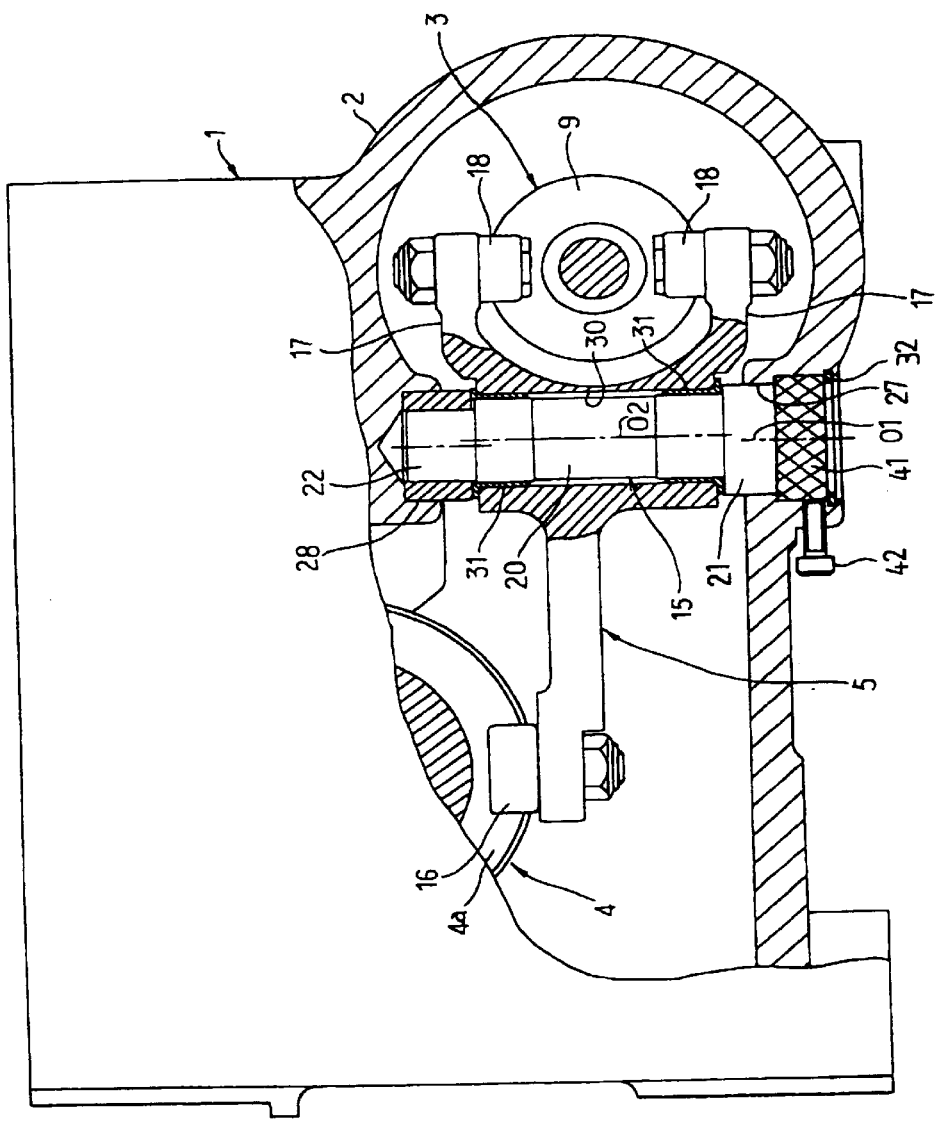
FIG. 5 is a view similar to FIG. 2, showing the machine tool of a second embodiment in accordance with the present invention.
Figure 6:
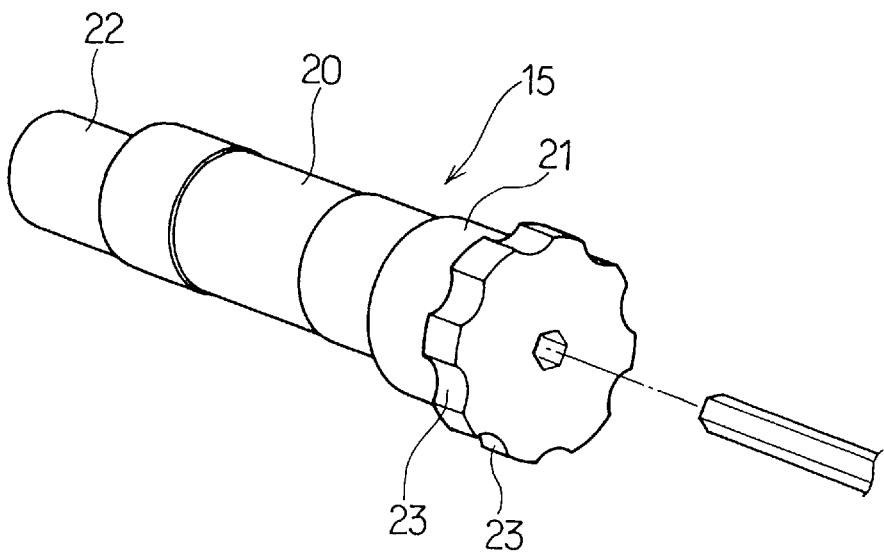
FIG. 6 is a perspective view of the fulcrum shaft showing a modified form.
Figure 7:
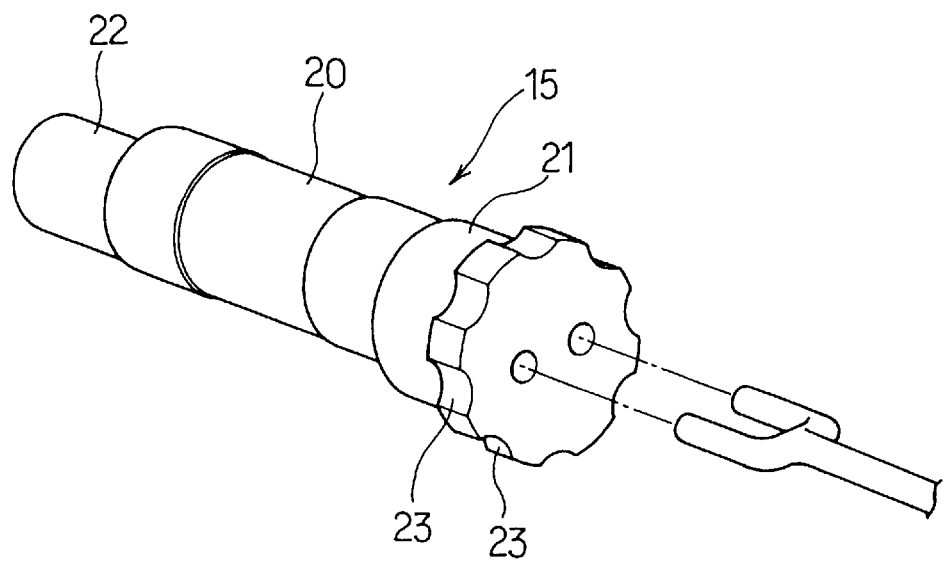
FIG. 7 is a perspective view of the fulcrum shaft showing another modified form.

Although the eight notches 23 are formed in the outer circumference of the first mounting shaft 21 of the fulcrum shaft 15 in the foregoing embodiment, seven or less or nine or more notches may be provided. Furthermore, although the vertical position of the fulcrum shaft 15 is adjusted in a plurality of stages in the foregoing embodiment, it may be adjusted in a non-stage manner as in the following second embodiment shown in FIG. 5.

In the second embodiment, an antislipping 41 such as knurling is applied to the outer circumference of the first mounting shaft 21 of the fulcrum shaft 15. A screw hole is formed in the circumferential wall of the mounting hole 27 formed in the side wall of the frame 2. A lock screw 42 is screwed into the screw hole so as to be movable into and out of the mounting hole 27.

In the above-described construction, the fulcrum shaft 15 is rotated to assume a desired position and thereafter, the lock screw 42 is screwed so that its distal end is caused to abut the portion of the antislipping 41 of the first mounting shaft 21, so that the fulcrum shaft 15 is positioned with respect to its rotating direction. Thus, the lock screw 42 and the antislipping 41 of the first mounting shaft 21 constitute positioning means for positioning the fulcrum shaft 15 or the support shaft 20 and the mounting shafts 21 and 22. The other construction in the second embodiment is the same as in the first embodiment. Accordingly, the same effect can be achieved in the second embodiment as in the first embodiment. Particularly in the second embodiment, the vertical position of the fulcrum shaft 15 is adjusted in the non-stage manner. Consequently, an amount of press of the unclamping lever 5 against the releasing section 9 can be adjusted further accurately.

In a modified form, the rotating means for rotating the fulcrum shaft 15 should not be limited to the screw hole 24 and the screw. A hexagonal recess into which a hexagon head wrench is fitted may be formed, instead. Furthermore, two holes may be formed and a rotating tool (adjusting tool) may be used which has two protrusions inserted into the holes so that the fulcrum shaft 15 is rotated. An elongated mounting hole extending along the axis of the spindle 3 may be formed in the frame 2 side on which the fulcrum shaft is mounted. The fulcrum shaft may be movable along the mounting hole axially with respect to the spindle 3. In this construction, the fulcrum shaft need not be decentered.

The pressing means for pressing the unclamping lever 5 should not be limited to the cam 4 (and the cam motor 13). A cylinder may constitute the pressing means, for example. Furthermore, the fulcrum shaft 15 may be provided at one end of the unclamping lever 5 and a middle portion of the unclamping lever may be pressed by the pressing means. Additionally, the unclamping lever may be bent into a generally L-shape.

The foregoing description and the drawings are merely illustrative of the principles of the present invention and are not to be construed in a limiting sense. Various changes and modifications will become apparent to those of ordinary skill in the art. These changes and modifications are seen to fall within the scope of the invention as defined by the appended claims.

I claim:

1. A machine tool comprising:

a spindle to which a tool is detachably clamped;

an unclamping lever provided for rocking motion and having two ends;

rocking means for rocking the unclamping lever;

a releasing section provided in the spindle so as to be pressed by the unclamping lever when the unclamping lever is rocked by the rocking means with a tool being clamped by the spindle, thereby releasing the tool from a clamped state; and a support shaft for rockably supporting the unclamping lever, the support shaft being fixed during a usual tool exchange and movable axially with respect to the spindle during adjustment of an amount of press of the unclamping lever.

2. A machine tool according to claim 1, wherein the support shaft includes a mounting shaft having a shaft center axially shifted from a shaft center of the support shaft, and the support shaft and the mounting shaft are movable about the shaft center of the mounting shaft.

3. A machine tool according to claim 2, further comprising rotating operation means provided on the mounting shaft for rotating the support shaft and the mounting shaft.

4. A machine tool according to claim 3, wherein the rotating operation means comprises a screw hole formed in the mounting shaft and a screw screwed into the screw hole.

5. A machine tool according to claim 3, wherein the rotating operation means comprises a hexagonal recess which is provided in the mounting shaft and into which a hexagon head wrench is fitted.

6. A machine tool according to claim 3, wherein the rotating operation means comprises two fitting holes provided in the mounting shaft and an operating tool having two protrusions fitted into the fitting holes respectively.

7. A machine tool according to claim 2, wherein two mounting shafts are provided integrally on front and rear ends of the support shaft respectively, and the mounting shaft provided on the front end of the support shaft has a larger outer diameter than the mounting shaft provided on the rear end of the support shaft.

8. A machine tool according to claim 1, wherein the releasing section comprises a ring-shaped member and which further comprises a cam follower provided on one end of the unclamping lever so as to abut the ring-shaped member.

9. A machine tool according to claim 8, wherein the rocking means includes a cam having a cam groove, and which further comprises a cam follower provided on the other end of the unclamping lever so as to be fitted into the cam groove of the cam of the rocking means.

10. A machine tool according to claim 2, further comprising positioning means for positioning the support shaft and the mounting shaft after the support shaft and the mounting shaft are rotated.

* * * * *